3,473,251
INSECT ELECTROCUTING DEVICE
Robert D. Kahn, Rockville Centre, N.Y., assignor to Fedtro, Inc., Rockville Centre, N.Y., a corporation of New York
Continuation-in-part of application Ser. No. 700,852 Jan. 26, 1968. This application Apr. 24, 1968, Ser. No. 723,715
Int. Cl. A01m 1/22
U.S. Cl. 43—112         5 Claims

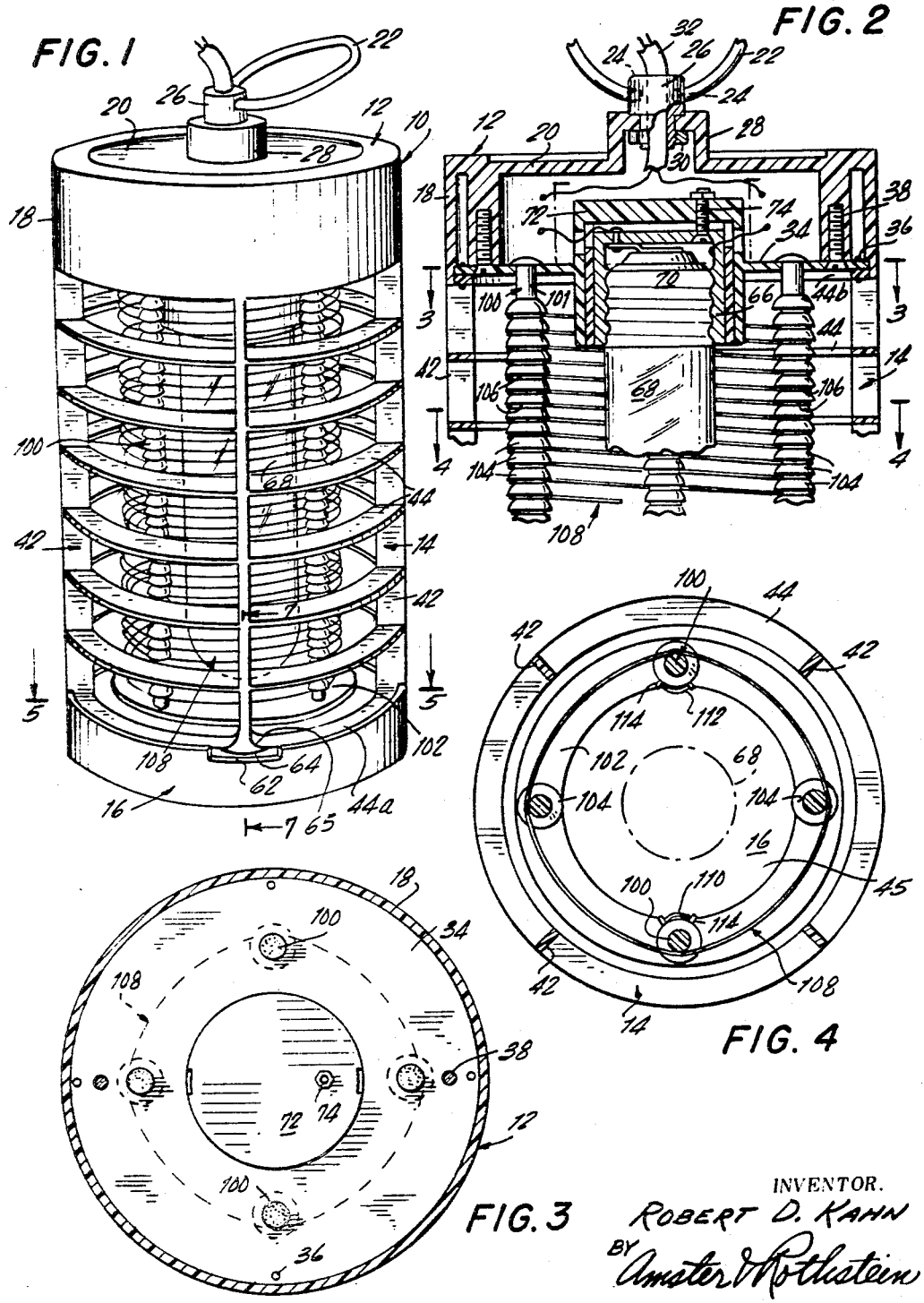
Oct. 21, 1969     R. D. KAHN     3,473,251
INSECT ELECTROCUTING DEVICE
Filed April 24, 1968     2 Sheets-Sheet 1
INVENTOR.
ROBERT D. KAHN
BY Amster & Rothstein
ATTORNEYS Oct. 21, 1969 R. D. KAHN 3,473,251
INSECT ELECTROCUTING DEVICE
Filed April 24, 1968 2 Sheets-Sheet 2
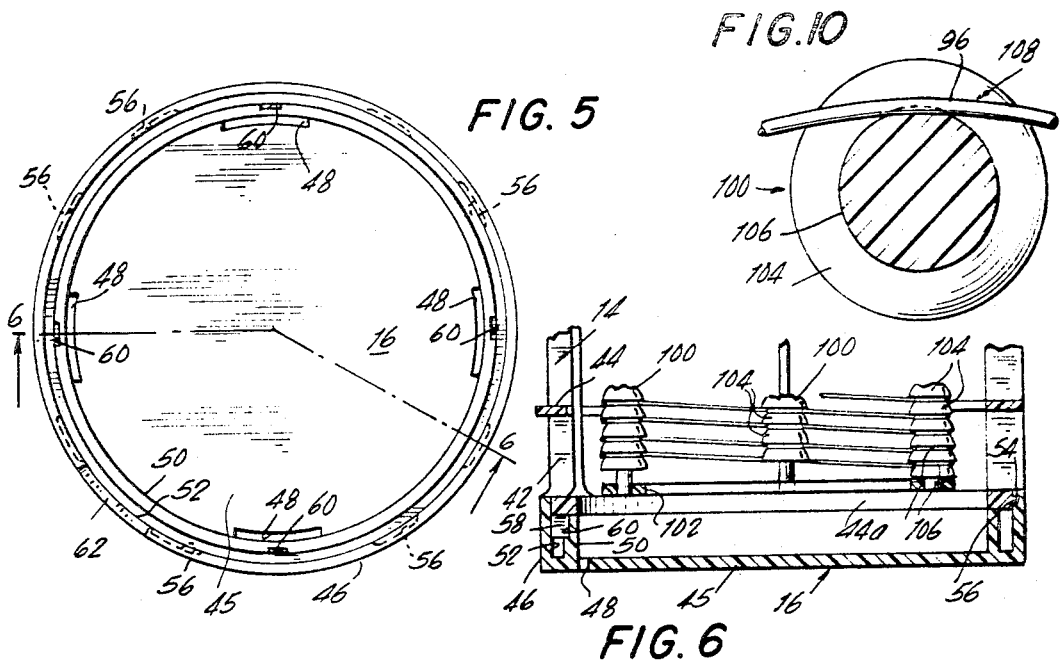
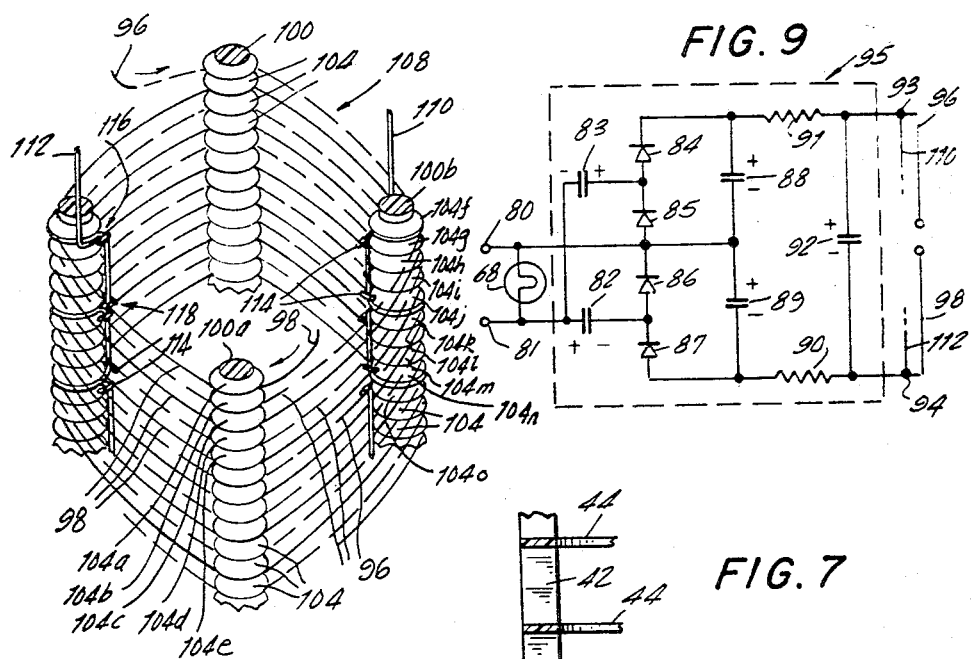
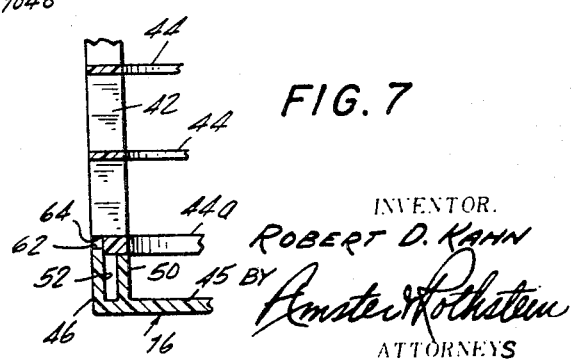
INVENTOR.
ROBERT D. KAHN
BY Amster Rothstein
ATTORNEYS

United States Patent Office 3,473,251
Patented Oct. 21, 1969

ABSTRACT OF THE DISCLOSURE

A device for electrocuting insects includes a bulb which generates ultraviolet rays for attracting flying insects, a coil carrying high voltage for electrocuting any insects coming into contact with it, a cylindrical guard surrounding the coil to protect against accidental contact by persons and pets, and an pan upon which the dead insects fall, and which may be removed for disposal of the insects.

---

This invention relates to a device for attracting flying insects and electrocuting such insects. This is a continuation-in-part of my now abandoned patent application, Ser. No. 700,852, filed Jan. 26, 1968, entitled "Insect Electrocuting Device."

It is the primary object of this invention to provide an insect electrocuting device especially suited for use around the home and in areas in which insects tend to congregate as, for example, in backyards during family cook-outs, around garden areas, around outdoor pools, in indoor areas to which insects have access, and which is effective to exterminate the numerous bothersome insects which frequent such places.

It is a further object of the present invention to provide an insect electrocuting device of the type described which attracts insects from over a wide area and which does so without the use of chemicals of any type.

It is another object of the present invention to provide an insect electrocuting device of the type described which exterminates insects in a quick and efficient manner and which provides for the easy disposal of the exterminated insects.

It is the further object of the present invention to provide an insect electrocuting device of the type described which is made completely safe in use by the provision of an encircling guard to prevent persons and pets from accidentally contacting the high voltage coil of the device.

In prior art devices having as their purpose the killing of flying insects around the home, several types have been prominent. In one type, the insects were attracted by a certain type of illumination and were led into a trap in the device. The trap could be entered easily but was so constructed as to be difficult to exit so that the insects could not escape and ultimately died. Traps of other devices were filled with water which also made it difficult for the insects to escape. In other types of insect killing devices, a chemical substance attracted the insects to the device. Once at the device, the insects were led into the aformentioned traps, or the chemical susbtance was such that close and prolonged contact with the chemical fumes in the area immediately adjacent to the device served to kill the insects.

These prior art devices had disadvantages in that the catching of insects in a trap from which there was only limited exit, or in a water trap, often failed to positively exterminate the insects and their escape was not infrequent. Moreover, the extended period of time required for the insects to die by virtue of their entrapment and the consequent noises emitted from the device during the insects' deaths were disagreeable to persons near the trap. As to the devices using chemicals, these fumes were often harmful, especially to children and pets and often the odor from these chemical substances could be detected by and was disagreeable to persons in the area.

In contrast, the present device presents a simple and efficient mechanism whereby insects are attracted by a bulb which generates short wave length ultraviolet rays in the fringe of the visible light range so that persons in the area of the device are hardly aware of this illumination. Further, once attracted to the device and in contact with it, the insects are electrocuted by a high voltage coil instantaneously and positively. The insects thereupon fall onto the pan of the device from which they may be subsequently disposed of quite readily.

The electrical circuit for the device includes a voltage quadrupler which increases conventional house voltage to a significantly higher voltage between adjacent windings of the coil.

The device includes several circumferentially spaced vertical struts about which the coil is wound. Each strut comprises a series of parasol-shaped retainers, with each coil convolution being held in place between a pair of adjacent retainers. The shape of these retainers tends to hold the wires of the coil in place, and encourages the shredding of water from the struts. The relatively long distance between wire convolutions at the point at which they abut a strut, due to the shape of the retainers, tends to discourage shorting by foreign matter.

The above brief description, as well as further objects, features, and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 illustrates the insect electrocuting device of the present invention in a perspective view;

FIG. 2 is an enlarged vertical cross sectional view of the upper portion of the device taken along a diameter thereof;

FIGS. 3 and 4 are horizontal cross sectional views of the device taken, respectively, substantially along the lines 3—3 and 4—4 of FIG. 2;

FIG. 5 is a plan view of the pan of the device taken substantially along the line 5—5 of FIG. 1, but shown detached from the remainder of the device;

FIG. 6 is a vertical cross sectional view of the lower portion of the device taken substantially along the line 6—6 of FIG. 5;

FIG. 7 is an enlarged fragmentary cross sectional view showing a keyhole slot used to remove the pan of the device, taken substantially along the line 7—7 of FIG. 1;

FIG. 8 is an enlarged view of the coil struts and winding of the device;

FIG. 9 is a schematic diagram of the electrical system of the device; and

FIG. 10 is an enlarged cross-section of a strut showing a wire embedded therein.

Referring now in detail to the drawings, the insect electrocuting device of the present invention includes a generally cylindrical housing 10 which has at its upper end, a cylindrical shell 12, at its intermediate portion a cylindrical guard 14 and at its lower end, a pan 16. The shell 12 includes a cylindrical side wall 18 and a circular-in-plan top wall 20. The interior of the shell is hollow to house other components, as will be described subsequently.

The insect electrocuting device is hung at any convenient location by a circular metal loop 22 secured to the top of the housing 10. More specifically, the loop 22 has a pair of spaced ends 24 which protrude into aligned apertures in a ferrule 26. The lower portion of the ferrule is reduced in diameter and passes through a raised hub 28 located centrally of the wall 20 of the shell 12. The lower end of the ferrule is externally threaded and a nut 30 retains the ferrule in place. The loop 22 can swivel with respect to the ferrule about a horizontal axis and the ferrule can rotate in the hub about a vertical axis. A power line 32 passes through ferrule 26 to electrical components within the shell, and is adapted to be connected to a source of power, typically a 110 v. outlet. The shell has an internal partition 34 which spans its lower periphery and defines, with the side wall 18 and the top wall 20, a cavity in which the electrical components are housed. The partition 34 is fixed to the shell by screws 38.

The shell 12 is fixed at its lower edge to the upper periphery of the guard 14. The guard is, as has been said, cylindrical and is lattice-like in construction. The guard comprises a number, desirably four, circumferentially spaced uprights 42 intersected by a number, desirably eight, rings 44, the rings being spaced uniformly along the vertical axis of the housing 10. The upper ends of the uprights are integral with the uppermost ring 44b, and this ring is fixed to the partition by rivets 36. The rectangular openings in the guard, as defined by the uprights and the rings, permit flying insects to pass readily therethrough, while preventing humans and pets from accidentally contacting the coil of the device.

The pan 16 is removably fixed to the lower periphery of the guard 14. The pan has a flat circular-in-plan bottom wall 45 and an outer side wall 46. The outside diameter of the side wall 46 is substantially the same as the outside diameter of the guard 14. The pan has a number of through slots 48 for the purpose of water drainage and ventilation. Desirably the slots are four in number and are evenly spaced adjacent the outer periphery of the bottom wall 45.

The pan 16 mates with the lower periphery of the guard 14. To this end, the pan 16 has an inner wall 50 protruding from the bottom wall 45 and running internally of the side wall 46. Th walls 46 and 50 define a circumferential channel 52 between them. The inner wall 50 is lower in height than the side wall 46. The lowermost ring 44a of the guard 14 has an inner diameter which is substantially the same as the inner diameter of the inner wall 50 and has an outer diameter less than that of the other rings 44, and which is slightly less than the inner diameter of the pan side wall 46. Accordingly, as seen in FIGS. 1, 6 and 7, the ring 44a overlies the inner wall 50 and the channel 52, and fits within the side wall 46. Further, the radially outer portion of the lower edge of each upright 42 abuts the side wall 46.

For the purpose of retaining the pan 16 on the lower portion of the guard 14, the lowermost ring 44a carries a number of radially outwardly protruding nibs 54 (see FIG. 6) which are received in small grooves 56 in the inner face of the side wall 46 of the pan 16. Desirably, there are eight such nibs 54 on the lowermost ring 44a, and eight such grooves 56 on the inside of the side wall 46. As best seen in FIG. 5, the grooves 56 (as well as the nibs 54) are grouped in pairs, the circumferential distance between the grooves of a pair being less than the circumferential distance between the adjacent grooves of different pairs. This spacing enables the pan 16 to be properly oriented with respect to the guard 14 in any one of four positions, whereas if the grooves 56 were uniformly spaced, the pan 16 could be joined to the guard 14 in any one of eight positions. The purpose of this configuration will be made evident subsequently.

To further orient the guard 14 with respect to the pan 16, the lowermost ring 44a carries a number of downwardly depending lugs 58. To receive these lugs, the inner wall 50 includes a number of cut-outs 60 and when the pan 16 is in place, each lug fits into a cut-out 60 and extends across the channel 52.

As was mentioned previously, the pan 16 is removably secured to the guard 14. For this purpose, and as is seen most clearly in FIGS. 1 and 7, the side wall 46 of the pan 16 has a slot 62 formed therein, the slot being sufficiently wide to accommodate a coin, such as a nickel or a dime. A radially outer portion of the lower edge of any one of the uprights 42 comprises a shoulder 64 which overhangs the slot 62 and for purposes of strength, each upright is flared outwardly as at 65 at its shoulder to increase the strength of this connection. Accordingly, when a coin is placed into the slot 62 and is twisted to a small extent, the bottom face of the coin pivots on the wall of the slot 62 while the upper face of the coin pries the shoulder 64 of the upright 42 upwardly, thereby forcing the nibs 54 upwardly out of their grooves 56 and separating the pan from the guard. The fillets 65 insure that this prying action does not break the shoulder 64 and its strut from the ring 44a. Since the housing 10 including the shell 12, the guard 14 and the pan 16 are all formed from a synthetic resin, these parts are somewhat resilient. Accordingly, the upward prying of the guard 14 with respect to the pan 16 may take place without failure of any parts. The nibs 54 as well as the lugs 58 are so located with respect to the grooves 56 and the cut-outs 60, respectively, that a shoulder 64 of an upright 42 always is situated over the slot 62. The pan is snapped back into position by the application of a small amount of force.

A female socket 66 is provided in the device to receive a vertically elongated bulb 68, the bulb being for the purpose of attracting flying insects. The socket 66 is conventional in design and meshes with the threaded base 70 of the bulb 68. The socket 66 is situated within a hub 72 formed centrally in the partition 34 and is fixed to the hub wall by a bolt 74. The bulb is coaxial with the bulb, is of 40–50 watt strength, and has a colored glass envelope, desirably of blue color. When the bulb is energized, it generates short wave length ultraviolet rays which attract phototropic flying insects to it.

FIG. 9 depicts schematically an illustrative circuit 95 for the purpose of deriving the high potential difference impressed across the coiled wires. The AC line voltage is applied across input terminals 80, 81, with lamp 68 also being connected across these terminals for direct energization by the line voltage. Circuit 95 is a voltage quadrupler; the DC voltage across output terminals 93, 94 is four times as great as the peak voltage between terminals 80, 81. Two positively charged wires 96, 110 are connected to positive output terminal 93, and two negatively charged wires 98, 112 are connected to negative output terminal 94.

When terminal 81 is positive with respect to terminal 80, current flows through capacitor 82 and diode 86. The capacitor charges, in the direction shown, to the peak line voltage. When the line voltage changes its relatively polarity, diode 86 is reverse biased and no current flows through it. At this time, however, diode 87 is forward biased. The positive plate of a capacitor 89 is connected to positive terminal 80. The negative plate of the capacitor is connected through diode 87 to the negative plate of capacitor 82. Since diode 87 is effectively a short circuit, the net voltage impressed across capacitor 89 is the sum of the voltages across capacitor 82 and terminals 80, 81. At the peak of the line voltage, the voltage across capacitor 89 is twice the peak line voltage since capacitor 82 has previously charged to the peak value. Consequently, the voltage across capacitor 89 is twice the peak line voltage in the direction shown.

During the next half cycle, diode 87 is reverse biased and no current flows from the line to capacitor 89. However, diode 86 is again forward biased and capacitor 82 charges to the peak line voltage once again. Capacitor 82 must be recharged during alternate half cycles because during every other half cycle part of its charge is transferred to capacitor 89.

Capacitors 83, 88 and diodes 84, 85 comprise another voltage doubler with the voltage across capacitor 88 being twice the peak line voltage. The circuit operates just as does the circuit comprising capacitors 82, 89 and diodes 86, 87. The only difference between the two circuits is that due to the different connections to the line terminals, capacitor 83 charges through diode 87, while capacitor 88 charges through diode 84 at the same time that capacitor 82 charges through diode 86.

Because the positive plate of capacitor 89 is connected to the negative plate of capacitor 88, the total voltate impressed across the series circuit including the two capacitors is four times the peak line voltage. In the absence of current flow through terminals 93, 94, no current flows through resistors 90, 91 and capacitor 92 charges to four times the peak line voltage. The quadrupled voltage across the capacitor 92 is applied to an insect when it strikes any two adjacent wire convolutions connected respectively to output terminals 93, 94, as described below.

The output terminals 93, 94 are connected to a pair of helically wound wires to form the high voltage coil of the device (see FIG. 9), the terminal 93 being connected to the wire 96 and the terminal 94 being connected to the wire 98. Desirably, the wires are nickel-plated copper. For purposes of clarity, in FIG. 8 the wire 96 is shown in dash lines and the wire 98 is shown in solid lines. The wires 96, 98 are wound about four spaced vertical struts 100, the upper end of each strut passing through the partition 34 (FIG. 2) and then being peened over this partition. The lower ends of the struts 100 are fixed in position by a ring 102 (FIG. 6) and these lower ends are forced into receiving apertures in this ring. The fixing of the struts at their upper and lower ends serves to retain the struts in the desired opposed relative positions, and the ring 102 serves to hold the ends of the struts and to reinforce the strut structure as a whole.

Each strut comprises a connected series of specially-shaped retainers 104, each retainer having a parasol-shaped upper face and a flat lower face. Each retainer is separated from its neighboring retainers by a small neck 106. The retainers hold the wires of the winding in place. The wires are wound on the struts in a fashion that each wire abuts a strut only at the neck 106 between retainers. Since the retainers both above and below each neck have portions which protrude radially outwardly to a further extent than the neck, said protruding portions comprise "high points" beyond which the wires cannot move. Thus, the retainers keep the wires in their desired helically-oriented position without any possibility of slippage. (See FIG. 2.)

The retainers are spaced uniformly on each strut; however, the struts are shifted axially of the housing 10 so that as a wire passes from neck to neck on successive struts, it winds as would a leadscrew along the housing axis. The positions of the struts, shifted with respect to one another, are fixed by providing the struts with ends 101 of different lengths, where the struts join the partition 34 and the ring 102 (see FIGS. 2 and 6.)

The convex shape of the retainers 104 enables the struts to quickly shed any raindrops which may fall thereon and assures that such water drops will not remain thereon. The relatively long distance between adjacent necks 106 on a strut, due to the convex upper "parasol" face of each retainer, tends to permit only the thinnest film, if any, of water from a raindrop to stretch therebetween. Such a thin film will be of relatively high resistance, preventing shorting between adjacent wire convolutions. The parasol shape of the retainers also tends to prevent dust, dead insects and other foreign matter from accumulating on the struts, all of which would cause electrical leakage. The leakage path between adjacent wire convolution is especially long when compared with the longitudinal spacing between adjacent convolutions.

The wires 96, 98 are wound in interleaved fashion about the struts to form the high voltage coil 108 which serves to electrocute insects coming into contact therewith. Each wire, as has been mentioned, is wound around the exterior of the struts and is retained between an adjacent pair of retainers in a position abutting the neck between such retainers. Moving from the top to the bottom of the coil (see strut 100a, FIG. 8), the wire 98 is seated between a pair of retainers 104a, 104b; the wire 96 is seated between the next pair of retainers 104b, 104c; and the wire 98 is seated between the next pair of retainers 104c, 104d and this continuous alternation continues throughout the remainder of the coil. Thus, each convolution of the wire 96 is bordered by convolutions of the wire 98, and since these wires are at a potential difference as described above in connection with FIG. 9, an insect coming into contact with two such adjacent convolutions will be electrocuted. The exterminated insect thereupon falls onto the pan 16 (FIG. 6) where such exterminated insects are gathered for their subsequent removal.

To further insure that the wires are maintained in place on the struts, the wires are embedded in the strut material at their abutting locations (see FIG. 10). For this purpose, the struts are desirably formed of a thermoplastic synthetic resin.

The foregoing is done by the following method: First, the wires are wound on the struts under mechanical tension. Then, current is passed through the wires until they become hot and melt the adjacent areas of the struts. As the plastic softens, the wire, due to its winding under tension, digs itself into the plastic of the struts and when next the plastic hardens, the wires are at least partially embedded therein.

A pair of vertical lead wires 110, 112 (FIGS. 4, 8 and 9) run along a pair of diagonally opposite struts 100. The wire 110 is connected to the same terminal as is the wire 96, that is, terminal 93, and the wire 112 is connected to the same terminal as is the wire 98, that is, terminal 94. The wire 110, in its path along one of the struts 100 (see, for example, strut 100b), is wound about the strut between the first two retainers 104f, 104g and after traversing vertically down the strut, is then wound about the strut between the fifth and sixth retainers, retainers 104j and 104k; wire 110 again continues down the strut 100, is then wound about the strut between the ninth and tenth retainers, retainers 104n and 104o and continues in this manner being wound about the strut after each fourth retainer. The wire 112 is wound about the opposed strut in the same manner. In winding about the strut, the wire 110 contacts only the wire 96 while the wire 112 contacts only the wire 98. Since the wires 110, 112 are respectively connected to terminals of opposite polarity and they contact the convoluted wires 96, 98 of the coil 108 at spaced intervals along the length of the coil, the segments of the coil as defined by the turns of the wires 110, 112 will maintain their substantial potential difference along the length of the coil 108, even if an insect should remain stuck to any two adjacent coils and independent of the resistance of wires 110, 112.

In an alternate embodiment of the coil 108, the vertical lead wires 110, 112 are wound about their respective struts after each second retainer. With reference to FIG. 8, in such an embodiment the lead wire 110 would be wound between retainers 104f, 104g, between retainers 104h, 104i, between retainers 104k, 104l, etc., and lead wire 112 would be wound in an analogous manner.

To retain the vertical lead wires 110, 112 in their desired locations along their respective struts, each of said struts has a series of wire guides 114 (FIGS. 2 and 8). The guides 114 protrude inwardly and each guide is fixed to a retainer 104 at the widest portion thereof. Each guide serves either as an abutment as at 116 over which a lead wire passes as it runs from its abutment with a neck 106 between a pair of retainers downwardly along the strut or as an abutment as at 118 under which a lead wire passes as it runs from its vertical fall to wind about a neck 106. The foregoing arrangement keeps the lead wires firmly in place, even during rough handling of the device.

A latitude of modification, change and substitution is intended in the foregoing disclosure and in some instances some features of the invention will be employed without a corresponding use of other features.

What is claimed is:

1. An insect electrocuting device comprising a bulb for attracting flying insects, a set of vertical spaced struts disposed around said bulb, each strut including a series of interconnected retainers each having a parasol-shaped upper face and a substantially flat lower face in a plane perpendicular to the axis of the strut for shedding drops of rain, a pair of interleaved helically wound bare wire coils passing around said struts and between the retainers thereon, a lattice-work guard surrounding said pair of coils, circuit means connected to said coils and adapted for connection to a power source to maintain adjacent convolutions of said coils at opposite polarities, said circuit means including a positive and a negative output terminal, one of said helically wound coils being connected to said positive output terminal and the other of said helically wound coils being connected to said negative output terminal, and further including a pair of vertical wires, one of said wires being connected to said positive output terminal and the other of said wires being connected to said negative output terminal, each of said wires being connected to the helically wound coil of the same polarity periodically along the length of the coil, and a pan situated below said coils and removably coupled to said guard.

2. An insect electrocuting device in accordance with claim 1 wherein each of said vertical wires is wound about a different strut.

3. An insect electrocuting device in accordance with claim 2 further including guides situated on said retainers to maintain said vertical wires in place.

4. An insect electrocuting device comprising a bulb for attracting flying insects, a set of vertical spaced struts disposed around said bulb, each strut including a series of interconnected retainers each having a parasol-shaped upper face and a substantially flat lower face in a plane perpendicular to the axis of the strut for shedding drops of rain, a pair of interleaved helically wound bare wire coils passing around said struts and between the retainers thereon, a lattice-work guard surrounding said pair of coils, circuit means connected to said coils and adapted for connection to a power source to maintain adjacent convolutions of said coils at opposite polarities, a pan situated below said coils and means removably coupling said pan to said guard, said means including a plurality of projecting members and a plurality of mating grooved members, some of said members being on the lower portion of said guard and the others of said members being on said pan for securing said pan to said guard, and further including adjacent segments on said guard and on said pan, said segments defining a slot and an overhang adapted to receive a coin and configured so that when the coin is twisted said pan is pried away from said guard.

5. An insect electrocuting device in accordance with claim 4 wherein said guard includes a plurality of vertical uprights and a plurality of intersecting horizontal rings, each of said vertical uprights terminating at its lower edge in an overhang, and wherein the lowermost of said rings carries said projecting members and said pan has a sidewall in which said grooved members are formed, said projecting members and said grooved members being spaced nonuniformly on said lowermost ring and said sidewall, respectively, so that when said pan is attached to said guard an overhang of one of said prights is located over the slot in said pan.

References Cited

UNITED STATES PATENTS

| | | | |
|---|---|---|---|
| 1,159,157 | 11/1915 | Bass | 43—112 |
| 2,475,182 | 7/1949 | Gardenhour | 43—112 |
| 2,951,310 | 9/1960 | Anderson et al. | 43—112 |
| 3,232,000 | 2/1966 | Gale et al. | 43—100 |
| 2,292,248 | 8/1942 | Stevens | 174—150 X |
| 2,306,186 | 12/1942 | Rankin | 200—148 |

FOREIGN PATENTS

| | | |
|---|---|---|
| 786,174 | 6/1935 | France. |
| 101,773 | 10/1923 | Switzerland. |
| 183,129 | 6/1936 | Switzerland. |
| 1,390,253 | 1/1965 | France. |

WARNER H. CAMP, Primary Examiner